United States Patent Office 3,366,706
Patented Jan. 30, 1968

3,366,706
DERIVATIVES OF CARBOXYL - CONTAINING COPOLYMERS FORMED BY THE REACTION OF THE PENDENT CARBOXYL GROUPS WITH GLYCIDYL ESTERS AND DICARBOXYLIC ANHYDRIDES
Joseph Anthony Vasta, Woodbury, N.J., assignor to E. I. du Pont de Nemours and Company, Wilmington, Del., a corporation of Delaware
No Drawing. Continuation-in-part of application Ser. No. 429,650, Feb. 1, 1965. This application May 29, 1967, Ser. No. 642,181
25 Claims. (Cl. 260—834)

ABSTRACT OF THE DISCLOSURE

A polymer of ethylenically unsaturated monomers that has attached to its backbone pendent ester groups which have the following type of structure

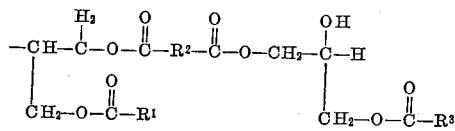

and thermosetting and air drying coating compositions formulated from this polymer.

---

This application is a continuation-in-part of the copending application Ser. No. 429,650, filed Feb. 1, 1965, now abandoned.

This invention relates to a unique vinyl addition polymer which bears pendent ester groups and to thermosetting and air drying coating compositions formulated from the novel polymer.

Background of the invention

The backbone of the polymer of this invention is formed from ethylenically unsaturated monomer units which include ethylenically unsaturated carboxylic acid monomer units. The pendent carboxyl groups attached to the backbone of the polymer are esterified with a glycidyl derivative which is then further reacted with an anhydride of a dicarboxylic acid, and the COOH group resulting from the anhydride is then esterified with a glycidyl derivative. The resulting polymer has an acid number up to about 40 and contains at least 5% and up to about 95%, by weight of the polymer of the aforementioned esterification product.

The novel polymer of this invention is useful in preparing thermosetting and air drying coating compositions. The pendent ester groups of the polymer provide these coating compositions with improved adhesion to a variety of substrates in comparison to coating compositions formed from polymers without the pendent ester groups. Also, the novel polymer is more compatible with conventional alkyd resins and nitrogen-formaldehyde resins than are polymers which do not contain the pendent ester groups of this invention.

Thermosetting coating compositions formed from the polymers of this invention are especially suited for finishing appliances, such as refrigerators, washing machines, ranges and the like. These finishes have excellent alkali and detergent resistance, resistance to tobacco, grease and chemical fumes, and resistance to food and drug stains and also show superior heat resistance. The finishes are harder than those used heretofore, which increases their mar and abrasion resistance. Coating compositions using these polymers can be cured at conventional baking temperatures without sacrificing these advantageous properties.

By using a glycidyl ester of an unsaturated fatty acid in forming the pendent ester groups, the novel polymer is particularly suitable for air drying coating compositions which are useful, for example, in automotive refinishing.

Summary of the invention

The polymer of this invention is formed from ethylenically unsaturated monomers and has an acid number up to about 40. The polymer contains pendent carboxyl groups which are attached to its backbone in which the active hydrogen atom of these carboxyl groups is replaced with an ester group. These pendent ester groups comprise about 5% to 95% by weight of the total weight of the polymer and have one of the following structures:

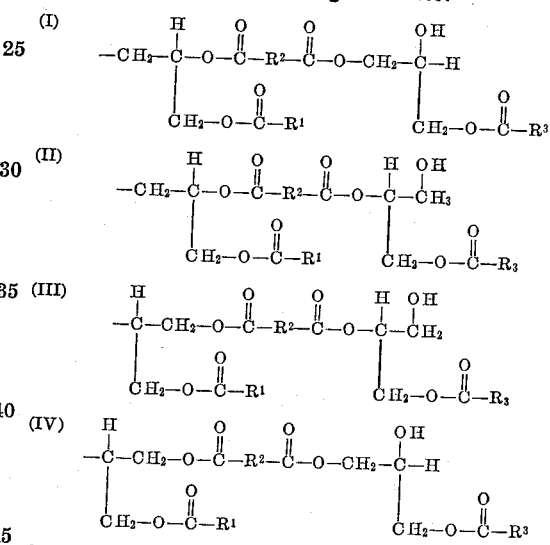

in which $R^1$ and $R^3$ are from the group of a saturated aliphatic hydrocarbon radical of 1–26 carbon atoms and an ethylenically unsaturated aliphatic hydrocarbon radical of 12–18 carbon atoms; $R^2$ is from the group of alkylene, vinylene, aromatic, carbocyclic, and heterocyclic radicals.

Preferably, the novel polymer contains about 40% to 60%, by weight of the total weight of the polymer, of the pendent ester group and more preferably, the polymer contains about 50% by weight of the pendent ester group.

Description of the invention

A wide variety of ethylenically unsaturated monomers can be used to prepare the backbone of the polymer of this invention. However, at least a sufficient amount of acid monomer units must be present in the polymer chain to attach the pendent ester groups, i.e., at least 5% by weight of the polymer is attributed to the pendent ester group. It is possible and sometimes desirable to have sufficient acid present to give the polymer an acid number up to about 40 after the esterification reaction.

The following are some of the many copolymerizable ethylenically unsaturated carboxylic acid monomers useful in this invention: methacrylic acid, acrylic acid, crotonic acid, itaconic acid and maleic acid. The following copolymerizable monomers when reacted with the aforementioned ethylenically unsaturated acid monomers form particularly useful compounds: alkyl esters of acrylic and methacrylic acid in which the alkyl group contains 1–12 carbon atoms, styrene, alkyl substituted styrene, acrylonitrile, conjugated dienes having 4–10 carbon atoms, such as butadiene; olefins, such as ethylene; vinyl acetate, dibutyl maleate or blends of two or more of the above compounds.

Especially useful monomer proportions for forming the backbone of the novel polymer are about 30–40% by weight styrene and 60–70% by weight acrylic acid. One particularly preferred polymer of this invention has a backbone of the following monomer proportions: 34–37% by weight styrene and 66–68% by weight acrylic acid.

The backbone of the polymer is formed by copolymerizing suitable ethylenically unsaturated monomers. The selection of monomers used in preparing the backbone of the polymers will, of course, be determined by the physical properties desired of the final product and the type of coating composition to be made from it. For example, if coating compositions for interior use are to be made, where optimum durability is unnecessary, the backbone of the polymer is composed principally of styrene units. On the other hand, if it is desired to make compositions suitable for exterior use, where high durability is needed, the backbone of the polymer is composed mainly of methyl methacrylate units.

The properties of the polymer can be balanced by varying the number and kind of monomers used. The physical nature of the final polymers can also be varied by manipulating reaction conditions and catalysts. All this is well known in the polymer art and can be done by anyone versed in polymer chemistry.

The novel pendent ester group is attached to the backbone of the polymer by reacting the hydrogen atom of the pendent carboxyl group with a glycidyl ester. The resulting pendent group of the glycidyl ester moiety is further reacted with an anhydride; the resulting COOH of the anhydride is then reacted with a glycidyl ester. Basically, the entire pendent ester group attached to the polymer backbone consists of the esterification product of glycidyl ester-anhydride-glycidyl ester.

The glycidyl ester moiety which is attached to the backbone of the polymer by reacting the active hydrogen of the pendent carboxyl group of the polymer has the formula

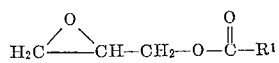

where $R^1$ is a saturated aliphatic hydrocarbon group containing 1–26 carbon atoms, or $R^1$ is an ethylenically unsaturated aliphatic hydrocarbon radical of 12–18 carbon atoms derived from a drying oil fatty acid.

Preferred for use because of the quality of the product obtained are esters where $R^1$ is a tertiary saturated aliphatic hydrocarbon group of the structure

where $R^4$ is —$CH_3$ and $R^5$ and $R^6$ are alkyl groups of 1–12 carbon atoms.

One particularly preferred glycidyl ester of this group because it imparts acid and alkali resistance to the final product is a mixed glycidyl ester described in U.S. Patent 3,275,583, issued Sept. 27, 1966, and is manufactured and sold by the Shell Chemical Company as "Cardura" E ester. This glycidyl ester is of a synthetic tertiary carboxylic acid and has the general formula

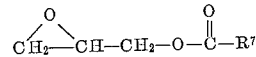

where $R^7$ is a tertiary aliphatic hydrocarbon group of 8–10 carbon atoms.

When a coating composition formed from the novel polymer of this invention is to be air dried, $R^1$ is an ethylenically unsaturated aliphatic hydrocarbon radical of 12–18 carbon atoms. This glycidyl ester is obtained by esterifying the acid chloride of one of the well known drying oil fatty acids, such as oleic acid, linoleic acid, linolenic acid, oleostearic acid and ricinoleic acid with glycidol. These acids are commonly found in tung oil, linseed oil, dehydrated castor oil and soya oil.

The preferred method for forming the above unsaturated glycidyl esters is to react the sodium salt of the fatty acid with epichlorohydrin. The reaction is as follows:

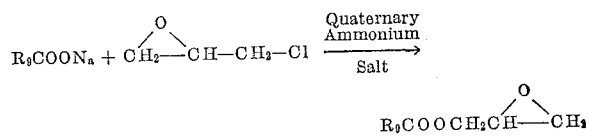

where $R_9$ is from one of the aforementioned drying oil fatty acids.

The pendent glycidyl ester group attached to the backbone of the polymer is further reacted with an anhydride of a dicarboxylic acid of the general formula

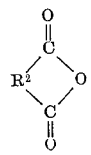

wherein $R^2$ is either alkylene, vinylene, aromatic, carbocyclic or a heterocyclic radical. The anhydride reacts with the free hydroxyl resulting from the glycidyl ester moiety that is attached to the backbone of the polymer to form a pendent group having a free carboxyl group.

Anhydrides useful in this invention in which $R^2$ is an alkylene group are formed from dicarboxylic acids of the general formula $(CH_2)_n(COOH)_2$ where $n$ is from 2–8. Typical dicarboxylic acids of this group are glutaric, adipic, pimelic and succinic acids with the preferred being succinic acid.

Useful anhydrides in which $R^2$ is a vinylene group are derived from dicarboxylic acids of the general formula

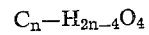

$$C_n-H_{2n-4}O_4$$

wherein $n$ is from 4–10. Typical dicarboxylic acids of this group are maleic and itaconic acids.

Another group of useful anhydrides are derived from dibasic aromatic acids, such as phthalic acid, uvitic acid and cumidinic acid. Often it is desirable to use a halogen substituted anhydride of one of the above aromatic dicarboxylic acids, such as tetrabromo phthalic anhydride. Halogen substituted anhydrides in which the halogen substitutent is either chlorine, bromine or fluorine are particularly useful in forming fire retardant coating compositions.

Anhydrides in which $R^2$ is a carbocyclic radical are useful, such as hexahydrophthalic anhydride, which has the following formula

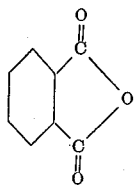

or tetrahydrophthalic anhydride which has the following formula:

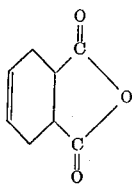

Anhydrides in which $R^2$ is a heterocyclic radical are also useful. One particularly useful compound has the general formula:

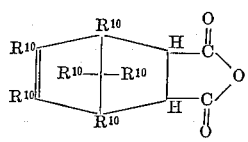

where $R^{10}$ is either chlorine, bromine or fluorine. The preferred compound is chlorendic anhydride in which $R^{10}$ as chlorine.

As aforementioned, the reaction of the anhydride with the pendent glycidyl ester moiety results in a pendent group attached to the polymer backbone having a free COOH group. The active hydrogen of this carboxyl group is reacted with one of the aforementioned glycidyl esters. This glycidyl ester moiety need not be identical to the initial glycidyl ester moiety; in fact, sometimes it is necessary to use a different glycidyl ester moiety to impart the resulting polymer with desirable properties. Obviously, this glycidyl ester moiety after it is reacted with the carboxyl group resulting from the anhydride reaction has a reactive hydroxyl group that could be further reacted with an anhydride to give a longer pendent chain; however, it is preferred to have the pendent group attached to the polymer backbone consist of the esterification product of glycidyl ester-anhydride-glycidyl ester.

One method of preparing the novel polymer of this invention is to first form the backbone of the polymer and then in subsequent steps form the pendent ester group by (1) esterification of carboxyl groups of the polymer backbone with a glycidyl ester, then (2) reacting the resulting pendent ester moiety with an anhydride and finally (3) esterifying the pendent carboxyl group resulting from the anhydride reaction with a glycidyl ester.

Polymerization of the monomers to form the backbone of the polymer can be carried out by simply admixing suitable monomers, in proportions selected to impart the desired physical properties of the product, dissolved in such inert solvents as xylene, toluene, methyl ethyl ketone or butyl alcohol.

A polymerization catalyst is then added to this mixture. Suitable for use are such catalysts as tertiary butyl peroxide, cumene hydroperoxide, and azobisbutyronitrile. The catalyst should be present in the reaction mixture at a concentration of 0.1% to 2%, by weight of the monomers present.

This mixture is then refluxed until polymerization is complete, which can be determined by a polymer solids determination.

To this reaction mixture, a glycidyl ester is added and refluxed until esterification is complete. From 0.05 to 3%, by weight of the polymer, of an esterification catalyst can be used, if desired, to decrease reaction time and to obtain consistently high yields.

Suitable esterification catalysts are such quaternary bases or salts as benzyltrimethylammonium hydroxide, benzyltrimethylammonium chloride, octadecyltrimethylammonium chloride, or an amine such as triethylamine.

The anhydride is next added to the esterified polymer and refluxed until the reaction is complete. Finally, sufficient glycidyl ester is added to esterify the pendent carboxyl groups, resulting from the anhydride reaction to form the novel pendent ester group of the polymer.

The resulting polymer solution is suitable for direct use in the preparation of coating compositions. If the pure polymer is desired, it can be obtained by simply stripping the solvent from the solution, leaving behind a solid mass whose physical properties can range from resinous to crystalline, depending on the monomers and the polymerization conditions used.

Another method for preparing the novel polymer of this invention consists of mixing all of the constituents in a reaction vessel, i.e., the monomers for the backbone of the polymer, the glycidyl ester and the anhydride, and refluxing until the polymerization is complete and the pendent ester group is formed. Obviously, this method is useful when there are complementary reaction rates between the various constituents, i.e., the polymer backbone is formed and the pendent ester group is simultaneously formed on the polymer backbone without the various constituents interfering with one another in the reaction.

In this method, the same solvents and polymerization catalysts are used as above, and in the same proportions. For maximum yield, the esterification catalyst should be a quaternary base or salt.

The mixture is then refluxed until the reaction is complete and solid impurites are then filtered off, giving a solution of a polymer of the invention, similarly suitable for direct use in coating compositions.

*Preparation of coating compositions*

Coating compositions can be prepared using the polymers of this invention by blending them with such solvents as high solvency hydrocarbons, or with alcohols, esters, ketones or ethers, and, if desired, with pigments and such modifying agents as plasticizers and fillers. This blending is accomplished by such customary procedures as sand-grinding or ball-milling the polymer and a solvent to form a mill base, with which the other components are then blended.

Thermosetting coating compositions especially suited for use as appliance enamels and the like can be made by using from 10 to 60%, by weight of the film-forming components of an aminoplast coating resin which can be a condensate of formaldehyde with melamine, urea, benzoguanamine or melamine/toluene-sulfonamide, in conjunction with the polymers of the invention. The addition of the aminoplast resins imparts improved hardness and solvent, alkali and heat resistance to the resulting finishes. These resins can be prepared according to directions in U.S. Patents 2,197,357, 2,508,875, and 2,191,957.

Compositions which give chemically inert coatings can be made by using from 5 to 50%, by weight of the film-forming components, of a phenol-formaldehyde resin with the polymers of the invention.

To coating compositions containing either an aminoplast condensate or a phenol-formaldehyde resin, 5 to 30%, by weight of the film-forming components, or an epoxy polyether condensate having a plurality of vic-epoxy moieties can be added. These condensates preferably contain at least one aliphatic hydroxyl moiety per molecule. Addition of such a resin to these coating compositions improves their metal adhesion, their flexibility and their corrosion resistance. These resins can be prepared according to directions in U.S. Patents 2,503,726, 2,592,560 and 2,694,694.

The aminoplast resins, phenol-formaldehyde resins and epoxy-polyether condensates can be added to the coating compositions by simple blending techniques.

The compositions can be applied by handspray or electrostatic spray techniques, or by dip or flow coating. They are then baked at from 259° F. to 400° F. for from 30 to 120 minutes.

The examples which follow are given for the purpose of illustrating the invention. All quantities shown are on a weight basis unless otherwise indicated.

EXAMPLE 1

Portion 1:                                                  Parts by weight
 Chlorendic anhydride - 1,4,5,6,7,7-hexachloro-
  bicyclo [2.2.1] - 5 - heptane-2,3-dicarboxylic
  anhydride _____ 87.3
 Styrene _____ 183.5
 Acrylic acid _____ 41.6
 "Cardura" E—a mixed ester described in U.S.
  Patent 3,275,583, issued Sept. 27, 1966 and
  is a glycidyl ester of a synthetic tertiary carboxylic acid of the formula $$CH_2\overset{O}{\diagdown}CH-CH_2-O\overset{O}{\overset{\|}{C}}-R$$

where R is a tertiary aliphatic hydrocarbon
  group of 8–10 carbon atoms _____ 198.8
 Xylene _____ 326.8
Portion 2:
 Ditertiary butyl peroxide _____ 2.0
 Xylene _____ 5.0
Portion 3:
 Ditertiary butyl peroxide _____ 2.0
 Xylene _____ 5.0
                                                          ─────
  Total _____ 852.0

The first portion is charged into a reactor and heated to 248° F. Portion 2 is then added with continuous mixing and the batch is held for 2 hours without additional heat and then held at the reflux temperature for an additional 2 hours. Portion 3 is added and the solution is again held at a reflux temperature for 2 hours. The polymer solution is then cooled to room temperature.

The resulting solution has a polymer solids content of about 60% and a Gardner-Holdt viscosity of Y–$Z_1$ and an acid number of 3. The polymer is the copolymerization and esterification product of the following reactants:

Percent by weight
Chlorendic anhydride _____ 17.1
Styrene _____ 35.9
"Cardura" E _____ 38.9
Acrylic acid _____ 8.1
                                                          ─────
  Total _____ 100.0

A thermosetting paint composition is then formulated by forming a pigment dispersion and mixing this dispersion with the novel polymer solution and a urea-formaldehyde resin.

Formula 1—Pigment dispersion

Parts by weight
Titanium dioxide pigment—rutile _____ 600
Xylol—industrial grade—10° _____ 300
Polymer solution of Example 1 _____ 100
                                                          ─────
  Total _____ 1000

The ingredients are premixed and charged into a conventional sandgrinding mill and ground to about 0.3 mil fineness.

The thermosetting paint is formed by mixing the following ingredients:
                                                           Parts by weight
Formula 1 pigment dispersion _____ 150
Polymer solution of Example 1 (60% solids) _____ 85
Urea formaldehyde resin (60% solids solution in
 butanol) _____ 67
Xylol _____ 15
                                                          ─────
  Total _____ 317

The resulting paint has a pigment to binder ratio of 90:100, a non-volatile solids content of about 60% and the binder composition is about 60% polymer of Example 1 and 40% urea-formaldehyde resin.

The paint is reduced to about 20–25% solids with industrial grade xylol and sprayed on a suitably primed steel plate and on an unprimed steel plate. The finish of each plate is baked for 30 minutes at 300° F. Each of the baked finishes have excellent resistance to solvents, such as methylethyl ketone, and is also very scratch resistant, i.e., a 2 H. pencil will not damage or mar the finish.

EXAMPLE 2

Portion 1:                                                 Parts by weight
 Phthalic anhydride _____ 7.46
 Methyl methacrylate _____ 39.31
 Methacrylic acid _____ 10.65
 "Cardura" E, glycidyl ester (described in Example 1) _____ 42.58
 Xylene _____ 52.70
Portion 2:
 Ditertiary butyl peroxide _____ 2.00
 Xylene _____ 5.00
Portion 3:
 Ditertiary butyl peroxide _____ 2.00
 Xylene _____ 5.00
                                                          ─────
  Total _____ 166.70

The first portion is charged into a reactor and heated to 248° F. Portion 2 is then added with continuous mixing and the batch is held for 2 hours without additional heat and then held at the reflux temperature for an additional 2 hours.

Portion 3 is added and the solution is again held at a reflux temperature for 2 hours. The polymer solution is then cooled to room temperature.

The resulting solution has a polymer solids content of about 60% and a Gardner-Holdt viscosity of $Z_1$ to $Z_3$ and an acid number of 10.

A thermosetting paint composition is formulated by the following ingredients:
                                                           Parts by weight
Formula 1 pigment dispersion _____ 150
Polymer solution of Example 2 (60% solids) _____ 85
Melamine formaldehyde resin (60% solids solution
 in butanol) _____ 67
Xylol _____ 15
                                                          ─────
  Total _____ 317

The resulting paint has a pigment binder ratio, a non-volatile content and a binder composition very similar to those of the paint of Example 1.

The paint is reduced to about 20–25% solids with industrial grade xylol and sprayed on a suitably primed steel plate. The finish is baked for 30 minutes at 300° F. The baked finish has excellent resistance to solvents, such as methylethyl ketone, and is sufficiently durable for exterior use and is also very scratch resistant, i.e., a 3 H. pencil will not damage or mar the finish.

EXAMPLE 3

Portion 1:  Part by weight
- Succinic anhydride _____ 5.20
- Styrene _____ 10.24
- Methyl methacrylate _____ 10.25
- Ethyl acrylate _____ 19.78
- "Cardura" E, glycidyl ester (described in Example 1) _____ 43.62
- Methacrylic acid _____ 10.91
- Xylene _____ 52.70

Portion 2:
- Ditertiary butyl peroxide _____ 2.00
- Xylene _____ 5.00

Portion 3:
- Ditertiary butyl peroxide _____ 2.00
- Xylene _____ 5.00

Total _____ 166.70

The first portion is charged into a reactor and heated to 248° F. Portion 2 is then added with continuous mixing and the batch is held for 2 hours without additional heat and then held at the reflux temperature for an additional 2 hours. Portion 3 is added and the solution is again held at a reflux temperature for 2 hours. The polymer solution is then cooled to room temperature.

The resulting solution has a polymer solids content of about 60% and a Gardner-Holdt viscosity of Z and an acid number of 5.

A thermosetting paint composition is formulated by using the same procedure and constituents as in Example 1 except the polymer solution of Example 3 is substituted in the pigment dispersion and in the paint for the polymer solution of Example 1.

The resulting paint has a pigment binder ratio, a non-volatile content and a binder composition very similar to those of the paint of Example 1.

The paint is reduced to about 20 to 25% solids with industrial grade xylol and sprayed on a suitable primed steel plate.

The baked finish has excellent solvent resistance, scratch resistance, good flexibility and adheres well to primed steel plates.

EXAMPLE 4

Portion 1:  Parts by weight
- Tetrabromophthalic anhydride _____ 20.48
- Styrene _____ 34.43
- Acrylic acid _____ 7.80
- "Cardura" E, glycidyl ester (described in Example 1) _____ 37.29
- Xylene _____ 52.70

Portion 2:
- Ditertiary butyl peroxide _____ 2.00
- Xylene _____ 5.00

Portion 3:
- Ditertiary butyl peroxide _____ 2.00
- Xylene _____ 5.00

Total _____ 166.70

The first portion is charged into a reactor and heated to 248° F. Portion 2 is then added with continuous mixing and the batch is held for 2 hours without additional heat and then held at the reflux temperature for an additional 2 hours. Portion 3 is added and the solution is again held at a reflux temperature for 2 hours. The polymer solution is then cooled to room temperature.

The resulting solution has a polymer solids content of about 60% and a Gardner-Holdt viscosity of X and an acid number of 15.

A thermosetting paint composition is formulated by using the same procedure and constituents as in Example 1 except the polymer solution of Example 4 is substituted in the pigment dispersion and in the paint for the polymer solution of Example 1.

The resulting paint as a pigment binder ratio, a non-volatile content and a binder composition very similar to those of the paint of Example 1.

The paint is reduced to about 20 to 25% solids with industiral grade xylol and sprayed on a suitable primed steel plate.

The baked finish has excellent solvent resistance, scratch resistance and is very resistant to heat.

EXAMPLE 5

Portion 1:  Parts by weight
- Styrene _____ 41.06
- Acrylic acid _____ 9.31
- "Cardura" E glycidyl ester (described in Example 1) _____ 44.47
- Xylene _____ 52.70

Portion 2:
- Ditertiary butyl peroxide _____ 2.00
- Xylene _____ 5.00

Portion 3:
- Ditertiary butyl peroxide _____ 2.00
- Xylene _____ 5.00

Portion 4:
- Maleic anhydride _____ 5.16

Total _____ 166.70

The first portion is charged into a reactor and heated to 248° F. Portion 2 is then added with continuous mixing and the batch is held for 2 hours without additional heat and then held at the reflux temperature for an additional 2 hours. Portion 3 is added and the solution is again held at a reflux temperature for 2 hours. Portion 4 is added and the solution is held at reflux temperature until the acid number of the solution is less than 10. The polymer solution is then cooled to room temperature.

The resulting solution has a polymer solids content of about 60% and a Gardner-Holdt viscosity of Y and an acid number of 5. The polymer is the copolymerization and esterification product of the following reactants:

Percent by weight
- Maleic anhydride _____ 5.16
- Styrene _____ 41.06
- Acrylic acid _____ 9.31
- "Cardura" E _____ 44.47

Total _____ 100.00

A thermosetting paint composition is formulated by using the same procedure and constituents as in Example 1 except the polymer solution of Example 5 substituted in the pigment dispersion of Example 1.

The resulting paint has a pigment binder ratio, a non-volatile content and a binder composition very similar to those of the paint of Example 1.

The paint is reduced to about 20 to 25% solids with industrial grade xylol and sprayed on a suitable primed steel plate.

The baked finish has excellent hardness, has good solvent and grease resistance and has excellent scratch resistance.

EXAMPLE 6

An air drying polymer solution that does not require baking at elevated temperature is formed as follows:

Portion 1:  Parts by weight
- Xylol _____ 79.0

Portion 2:
- Methyl methacrylate _____ 30.0
- Methacrylic acid _____ 6.6
- Ditertiary butyl peroxide _____ 1.0

Portion 3:
- Soya oil fatty acid glycidyl ester _____ 52.0
- Phthalic anhydride _____ 11.4

Portion 4:
- Xylol _____ 20.0

Total _____ 200.0

Portion 1 is charged into a reaction vessel and heated to reflux temperature of 140° C. Portion 2 is premixed and gradually added with constant stirring over a period of about 4 hours. The polymer solution is held at the reflux temperature until the solution reaches a constant viscosity. Portion 3 is premixed and then charged into a reactor and the batch is held at the reflux temperature until the acid number is about 3 or less, which is reached in about 2½ hours.

Portion 4 is then added to dilute the polymer solution to about 50% solids. The resulting polymer solution has a Gardner-Holdt viscosity of X and an acid number of 2.

The polymer is the copolymerization and esterification product of the following reactants:

|  | Percent by weight |
|---|---|
| Methyl methacrylate | 30.0 |
| Methacrylic acid | 6.6 |
| Glycidyl ester of soya oil fatty acids | 52.0 |
| Phthalic anhydride | 11.4 |
| Total | 100.0 |

An air drying paint composition is formulated by mixing a pigment dispersion with the above polymer solution.

*Formula 2—Pigment dispersion*

|  | Parts by weight |
|---|---|
| Titanium dioxide pigment—rutile | 600 |
| Xylol—industrial grade | 280 |
| Polymer solution of Example 6 (50% solids) | 120 |
| Total | 1000 |

The ingredients are premixed and charged into a conventional sand grinding mill and ground to 0.3 mil fineness.

The air drying paint is formed by mixing the following ingredients:

|  | Parts by weight |
|---|---|
| Formula 2 pigment dispersion | 150 |
| Polymer solution Example 6 (50% solids) | 183 |
| Cobalt naphthenate drier solution (6% by weight cobalt) | 1 |
| Lead naphthenate drier solution (24% by weight lead) | 2 |
| Total | 336 |

The resulting paint has a pigment to binder ratio of 90:100, and a non-volatile solids content of 57%.

The paint is diluted to about 20 to 25% solids and sprayed on a primed steel plate. The finish dried in air to a tack free, glossy finish in about 4 hours. After 24 hours, the finish had excellent resistance to gasoline. Initially, the finish had a pencil hardness of about 2B, i.e., it resisted scratching of a pencil having a 2B hardness, but after 2 weeks, the finish cured to a pencil hardness of about HB. When the finish is forced dried at 160° C., it cures to a pencil hardness of H in about 1 hour.

EXAMPLE 7

|  | Parts by weight |
|---|---|
| *Portion 1:* |  |
| Xylene | 102.15 |
| "Cardura" E glycidyl ester (described in Example 1) | 91.22 |
| Acrylic acid | 8.94 |
| Xylene | 2.00 |
| *Portion 2:* |  |
| Tetrahydrophthalic acid | 56.33 |
| *Portion 3:* |  |
| Styrene | 151.14 |
| Acrylic acid | 29.92 |
| "Cardura" E glycidyl ester (described in Example 1) | 109.51 |
| Xylene | 173.33 |
| Ditertiary butyl peroxide | 1.80 |
| Xylene | 10.00 |
| *Portion 4:* |  |
| Ditertiary butyl peroxide | 2.60 |
| Xylene | 6.34 |
| *Portion 5:* |  |
| Butanol | 67.72 |
| Total | 813.00 |

Portion 1 is charged into a reactor and heated to 150° F. and Portion 2 is charged into the reactor and the ingredients are heated to 285° F. and held at this temperature for about 45 minutes. Portion 3 is then slowly added to the mixture while maintaining the temperature of the batch at about 270° F. After Portion 3 has been added, the ingredients are held at the reflux temperature for about 1 hour. Portion 4 is then added and the ingredients are held at the reflux temperature for 4 hours and then Portion 5 is added and the polymer solution is cooled to room temperature.

The resulting solution has a polymer solids content of about 55% and a Gardner-Holdt viscosity of Z and an acid number of 12–18.

A thermosetting paint composition is formulated by using the same procedure and constituents as in Example 1 except the polymer solution of Example 7 is substituted in the pigment dispersion and in the paint for the polymer solution of Example 1.

The resulting paint has a pigment binder ratio, a non-volatile content and a binder composition very similar to those of the paint of Example 1.

The paint is reduced to about 20 to 25% solids with industrial grade xylol and sprayed on a suitable primed steel plate.

The baked finish has excellent solvent resistance, scratch resistance, good flexibility and adheres well to primed and unprimed steel plates.

I claim:
1. A polymer of ethylenically unsaturated monomers having an acid number up to about 40, said polymer having pendent carboxyl groups attached to its backbone and having active hydrogen atoms of these carboxyl groups replaced with ester groups; said ester groups comprising about 5–95% of the total weight of the polymer and having a structure selected from the group consisting of

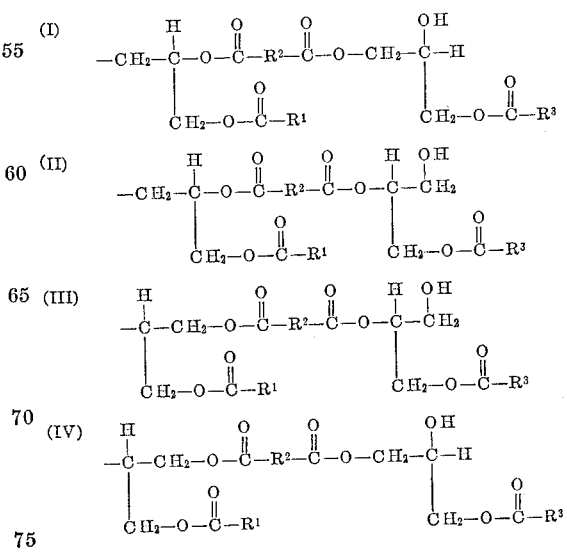

wherein $R^1$ and $R^3$ are from the group of a saturated aliphatic hydrocarbon radical of 1 through 26 carbon atoms, ethylenically unsaturated aliphatic hydrocarbon radical of 12 through 18 carbon atoms; $R^2$ is from the group of alkylene, vinylene, aromatic, carbocyclic and heterocyclic radicals.

2. The polymer of claim 1 in which the ester groups comprise about 40–60% of the total weight of the polymer.

3. The polymer of claim 1 in which the backbone consists essentially of units of an $\alpha,\beta$-unsaturated carboxylic acid and units of an aromatic hydrocarbon having a vinylene group.

4. The polymer of claim 1 in which the backbone consists essentially of units of an $\alpha,\beta$-unsaturated carboxylic acid which is selected from the group consisting of methacrylic acid, acrylic acid, crotonic acid, itaconic acid, and maleic acid and units of styrene, in which $R^1$ and $R^3$ are each selected from the group consisting of a tertiary aliphatic hydrocarbon group of 8 through 10 carbon atoms and an ethylenically unsaturated aliphatic hydrocarbon group of 12 through 18 carbon atoms, and in which $R^2$ is a divalent radical selected from the group consisting of vinylene, phenylene, phenylene having at least one of the hydrogens replaced with a halogen selected from the group consisting of chlorine, bromine and fluorine, an alkylene radical of $-(CH_2)_n$ where $n$ is from 2 through 8, a carbocyclic radical selected from the group consisting of

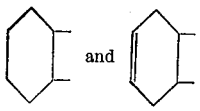

and a heterocyclic radical of

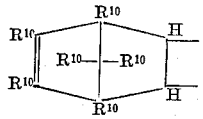

in which $R^{10}$ is a halogen selected from the group consisting of fluorine, bromine and chlorine.

5. The polymer of claim 4 in which the backbone consists essentially of units of acrylic acid and units of styrene.

6. The polymer of claim 5 in which $R^2$ is a divalent radical of the formula

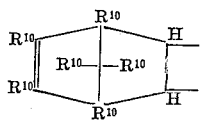

in which $R^{10}$ is chlorine, $R^1$ and $R^3$ are each a tertiary aliphatic hydrocarbon group of 8 through 10 carbon atoms.

7. The polymer of claim 5 in which $R^2$ is phenylene and $R^1$ and $R^3$ are each a tertiary aliphatic hydrocarbon group of 8 through 10 carbon atoms.

8. The polymer of claim 5 in which $R^2$ is phenylene having four active hydrogen atoms replaced with bromine and $R^1$ and $R^3$ are each a tertiary aliphatic hydrocarbon group of 8 through 10 carbon atoms.

9. The polymer of claim 5 in which $R^2$ is vinylene, $R^1$ and $R^3$ are each a tertiary hydrocarbon group of 8 through 10 carbon atoms.

10. The polymer of claim 5 in which $R^2$ is of the formula

and $R^1$ and $R^3$ are each a tertiary hydrocarbon group of 8 through 10 carbon atoms.

11. The polymer of claim 1 in which the backbone consists essentially of an $\alpha,\beta$-unsaturated carboxylic acid which is selected from the group consisting of methacrylic acid, acrylic acid, crotonic acid, itaconic acid and units of an ester of methacrylic acid and a $C_1$-$C_4$ saturated aliphatic monohydric alcohol, in which $R^1$ and $R^3$ are each selected from the group consisting of a tertiary aliphatic hydrocarbon group of 8 through 10 carbon atoms and an ethylenically unsaturated aliphatic hydrocarbon group of 12 through 18 carbon atoms, and in which $R^2$ is a divalent radical selected from the group consisting of vinylene, phenylene, phenylene having at least one of the hydrogens replaced with a halogen selected from the group consisting of chlorine, bromine and fluorine, an alkylene radical of $-(CH_2)_n$ where $n$ is from 2 through 8, a carbocyclic radical selected from the group consisting of

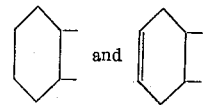

and a heterocyclic radical of

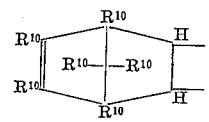

in which $R^{10}$ is a halogen selected from the group consisting of fluorine, bromine and chlorine.

12. The polymer of claim 11 in which the backbone consists essentially of units of methyl methacrylate and methacrylic acid.

13. The polymer of claim 12 in which $R^2$ is phenylene and $R^1$ and $R^3$ are each a tertiary aliphatic hydrocarbon group of 8 through 10 carbon atoms.

14. The polymer of claim 12 in which $R^2$ is phenylene and $R^1$ and $R^3$ are each an ethylenically aliphatic hydrocarbon group of 12 through 18 carbon atoms.

15. The polymer of claim 1 in which the backbone consists essentially of an $\alpha,\beta$-unsaturated carboxylic acid selected from the group consisting of methacrylic acid, acrylic acid, crotonic acid, itaconic acid and maleic acid and units of a mixture of esters of methacrylic acid and a $C_1$ to $C_8$ saturated aliphatic monohydric alcohol and esters of acrylic acid and a $C_1$ to $C_8$ saturated aliphatic alcohol, in which $R^1$ and $R^3$ are each selected from the group consisting of a tertiary aliphatic hydrocarbon group of 8 through 10 carbon atoms and an ethylenically unsaturated aliphatic hydrocarbon group of 12 through 18 carbon atoms, and in which $R^2$ is a divalent radical selected from the group consisting of vinylene, phenylene, phenylene having at least one of the hydrogens replaced with a halogen selected from the group consisting of chlorine, bromine and fluorine, an alkylene radical of $-(CH_2)_n$ where $n$ is from 2 through 8, a carbocyclic radical selected from the group consisting of

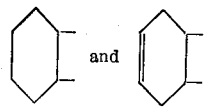

and a heterocyclic radical of

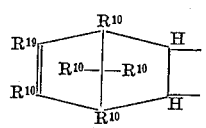

in which $R^{10}$ is a halogen selected from the group consisting of fluorine, bromine and chlorine.

16. The polymer of claim 15 in which the polymer backbone consists essentially of units of methacrylic acid, methyl methacrylate and ethyl acrylate and in which $R^1$ and $R^3$ are each a tertiary aliphatic hydrocarbon group of 8 through 10 carbon atoms and $R^2$ is an alkylene radical of $-(CH_2)_n$ where $n$ is 2 through 8.

17. The polymer of claim 1 in which the backbone consists essentially of units of styrene, methyl methacrylate, ethyl acrylate, methacrylic acid, and in which $R^1$ and $R^3$ are each a tertiary aliphatic hydrocarbon group of 8 through 10 carbon atoms and $R^2$ is $-(CH_2)_n$ where $n$ is 2.

18. The polymer of claim 1 in which $R^1$ and $R^3$ are each a tertiary aliphatic hydrocarbon radical of the structure

where $R^4$ is methyl and $R^5$ and $R^6$ are alkyl groups of 1–12 carbon atoms.

19. A coating composition comprising at least one polymer according to claim 1 and a solvent therefor.

20. A coating composition comprising at least one polymer according to claim 1, and from 10 through 60%, by weight of the film-forming components of an aminoplast coating resin.

21. A coating composition comprising at least one polymer according to claim 1, and from 5 through 50%, by weight of the film-forming components of a phenol-formaldehyde.

22. A coating composition comprising the polymer of claim 6 and from about 5–50% by weight of the film-forming components of a urea formaldehyde resin and a solvent for said film-forming components.

23. A coating composition comprising at least one polymer according to claim 1 and from 5 through 50%, by weight of the film-forming components of a melamine-formaldehyde resin.

24. A coating composition comprising the polymer of claim 10 and from about 5–50% by weight of the film-forming components of a urea formaldehyde resin and a solvent for said film-forming components.

25. A coating composition comprising at least one polymer according to claim 1, from 5 through 30%, by weight of the composition, of an epoxy-polyether condensate and from 10 through 60%, by weight of the film-forming components of an aminoplast coating resin.

References Cited
UNITED STATES PATENTS

| | | | |
|---|---|---|---|
| 3,002,959 | 10/1961 | Hicks | 260—88.1 |
| 3,157,600 | 11/1964 | Matson | 252—54.6 |

GEORGE F. LESMES, *Primary Examiner.*

P. LIEBERMAN, *Assistant Examiner.*